(12) United States Patent
Yano

(10) Patent No.: US 7,099,104 B2
(45) Date of Patent: Aug. 29, 2006

(54) METHOD FOR SERVO WRITING AND DISK DRIVE WITH SERVO CONTROL SYSTEM

(75) Inventor: Koji Yano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 10/714,656

(22) Filed: Nov. 18, 2003

(65) Prior Publication Data

US 2004/0105186 A1 Jun. 3, 2004

(30) Foreign Application Priority Data

Nov. 29, 2002 (JP) ............................. 2002-347500

(51) Int. Cl.
 G11B 21/02 (2006.01)
 G11B 5/596 (2006.01)
 G11B 5/09 (2006.01)
(52) U.S. Cl. .................. 360/75; 360/48; 360/77.08
(58) Field of Classification Search ................. 360/75, 360/76, 77.08, 77.02, 77.07, 48, 78.04
 See application file for complete search history.

(56) References Cited

U.S. PATENT DOCUMENTS

| 4,502,082 A | * | 2/1985 | Ragle et al. | ................. 360/76 |
| 4,823,212 A | * | 4/1989 | Knowles et al. | ......... 360/77.08 |
| 6,025,971 A | | 2/2000 | Inoue et al. | |
| 6,324,032 B1 | | 11/2001 | Ohtsuka et al. | |
| 6,795,277 B1 | * | 9/2004 | Tsuchiya et al. | ............. 360/317 |

FOREIGN PATENT DOCUMENTS

| JP | 04-139670 | 5/1992 |
| JP | 11-25402 | 1/1999 |
| JP | 2000-268516 | 9/2000 |
| JP | 2001-189062 | 7/2001 |

OTHER PUBLICATIONS

Japanese Office Action dated Jul. 26, 2005 for Appln. No. 2002-347500.
Austrian Search Report for Application No. 200306377-3 dated Aug. 16, 2004.

* cited by examiner

Primary Examiner—Andrew L. Sniezek
(74) Attorney, Agent, or Firm—Pillsbury Winthrop Shaw Pittman, LLP

(57) ABSTRACT

In a disk drive, a disk medium includes servo areas on which servo data is recorded and data areas on which data is recorded. In each of data tracks in, e.g., an outer radius of the disk medium, the inclination $\theta 2$ of the servo data recorded on the servo areas is smaller than the inclination $\theta 1$ of the data recorded on the data areas.

11 Claims, 5 Drawing Sheets

METHOD FOR SERVO WRITING AND DISK DRIVE WITH SERVO CONTROL SYSTEM

CROSS-REFERENCE TO RELATED APPLICATIONS

This application is based upon and claims the benefit of priority from the prior Japanese Patent Application No. 2002-347500, filed Nov. 29, 2002, the entire contents of which are incorporated herein by reference.

BACKGROUND OF THE INVENTION

1. Field of the Invention

The present invention generally relates to a disk drive, and more particularly, to a servo write technique that improves in head positioning accuracy.

2. Description of the Related Art

In the field of a disk drive that-is typified by a hard disk drive, recently, the disk drive has dramatically increased in recording density in order to meet a demand for its large capacity and downsizing.

In a disk drive, generally, the recording density (TPI: track per inch) of data tracks formed on a disk medium is heightened to improve the recording density of the disk medium. This is achieved by improving head positioning accuracy.

The head positioning accuracy necessitates improving both a servo control system for head positioning control and a servo track write technique for recording servo data for the head positioning control.

In the servo control system, a head is positioned in a target point on the disk medium in accordance with servo data read out of the disk medium by the head.

The servo track write technique is one for accurately writing servo data in specified areas (servo areas) on the disk medium usually using a servo track writer (STW) that is exclusively used for the technique.

The STW has a problem that the skew angle of the head erases servo data of adjacent tracks to cause an erase area. In the STW and disk drive, generally, the head is loaded onto a rotary actuator and configured to seek in the radial direction of the disk medium.

The skew angle is the absolute value of the inclination of the head with regard to the data tracks on the disk medium. The erase area occurs because one end of a magnetic gap of a write head protrudes toward an adjacent track.

The STW usually writes servo data while moving a servo head at ½ or ⅓ track intervals on the disk medium. Thus, the erase area becomes much easier to occur and results degrading the signal quality of servo data recorded on the disk medium. If, moreover, the TPI of the disk medium increases, the proportion of erase areas to data tracks also increases, with the result that the adverse affect of the erase areas becomes large.

In the field of a disk drive, a drive using a perpendicular magnetic recording method has recently been developed as a technique of increasing the recording density further. A disk drive of a perpendicular magnetic recording type employs a single pole type head as a write head. Even using such a single pole type head, an erase area is generated by the skew angle as described above.

A method of reducing the above erase area due to the skew angle of a head is proposed (see, for example, Jpn. Pat. Appln. KOKAI Publications Nos. 2000-268516 and 2001-189062).

According-to the method in the above Publications, servo data is written by seeking a head from the outermost radius of a disk medium to a position in the radial direction of the medium in which the skew angle is 0°. In other words, the respective operations are performed separately and selectively.

In the method in the above Publications, since all erase areas generated on the disk medium are overwritten, they can be deleted. However, no servo data can be recorded on an area close to the position in which the skew angle is 0°, thereby generating an area that cannot be used as a data track.

In the perpendicular magnetic recording method, it has been confirmed that an erase area can be reduced by devising a method of designing the pole of a single pole type head. In other words, since the width of the erase area is proportionate to the thickness of the pole, the erase area can be reduced by thinning the pole. If, however, the pole is thinned, the area of the pole decreases to lower the capability of recording of a write head.

There is another method of reducing an erase area by tapering a head into a trapezoid. In this method, too, however, a greatly tapered head reduces the area of the pole and thus lowers the recording capability of a write head. It is not easy to manufacture a greatly tapered trapezoidal head from its practical aspects.

BRIEF SUMMARY OF THE INVENTION

In accordance with one embodiment of the present invention, there is provided a disk drive that is capable of preventing an erase area from occurring on a disk medium and improving the head positioning accuracy.

The disk drive comprises a head which reads/writes data from/to a disk medium that rotates, an actuator which includes the head and rotates in a radial direction of the disk medium to move the head to a target point, and a controller which controls the actuator to position the head in the target point in accordance with serve data read from the disk medium by the head.

The disk medium includes a number of data tracks having servo areas and data areas. When the head records data on the data areas in one of outer and inner radiuses of the disk medium, the servo data whose inclination differs from that of the data is recorded on the servo areas in one of the outer and inner radiuses.

BRIEF DESCRIPTION OF THE SEVERAL VIEWS OF THE DRAWING

The accompanying drawings, which are incorporated in and constitute a part of the specification, illustrate embodiments of the invention, and together with the general description given-above and the detailed description of the embodiments given below, serve to explain the principles of the invention.

FIG. 1AA shows the relative inclination of the servo area and data area at the innermost radius of the medium in accordance with an embodiment of the invention.

DETAILED DESCRIPTION OF THE INVENTION

An embodiment of the present invention will now be described with reference to the accompanying drawings.

(Structure of Disk Drive)

Figure 4:
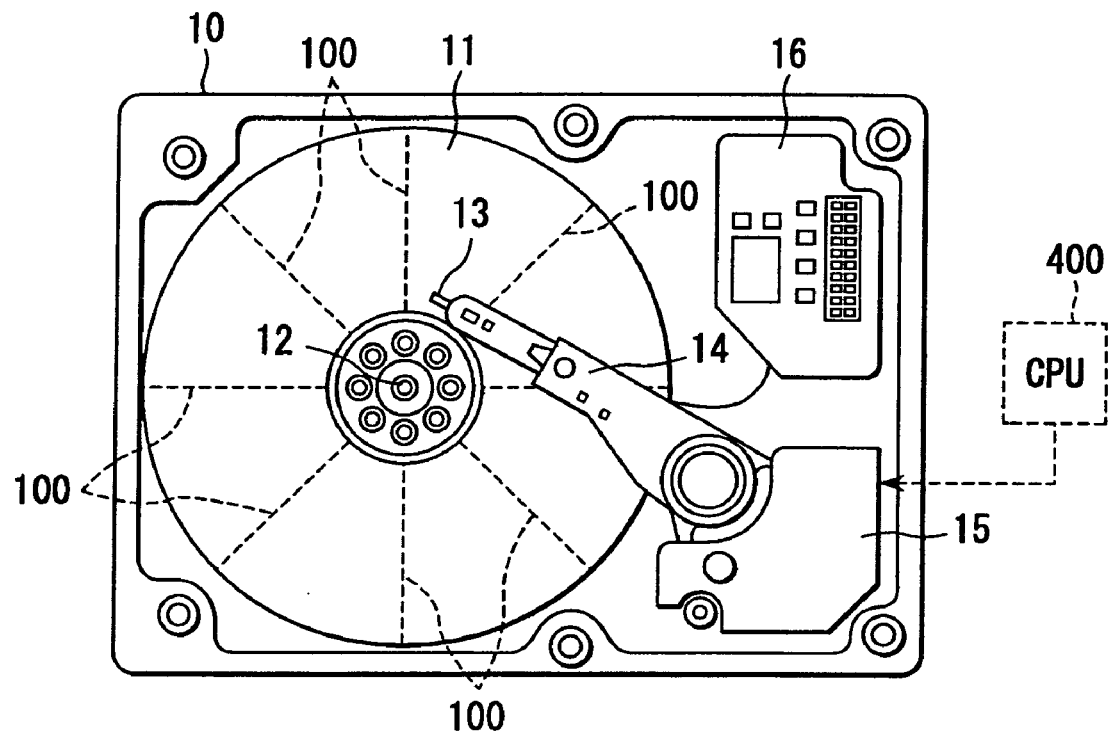
FIG. 4 is a block diagram of the principal part of a disk drive according to the embodiment of the present invention.
Figure 5:
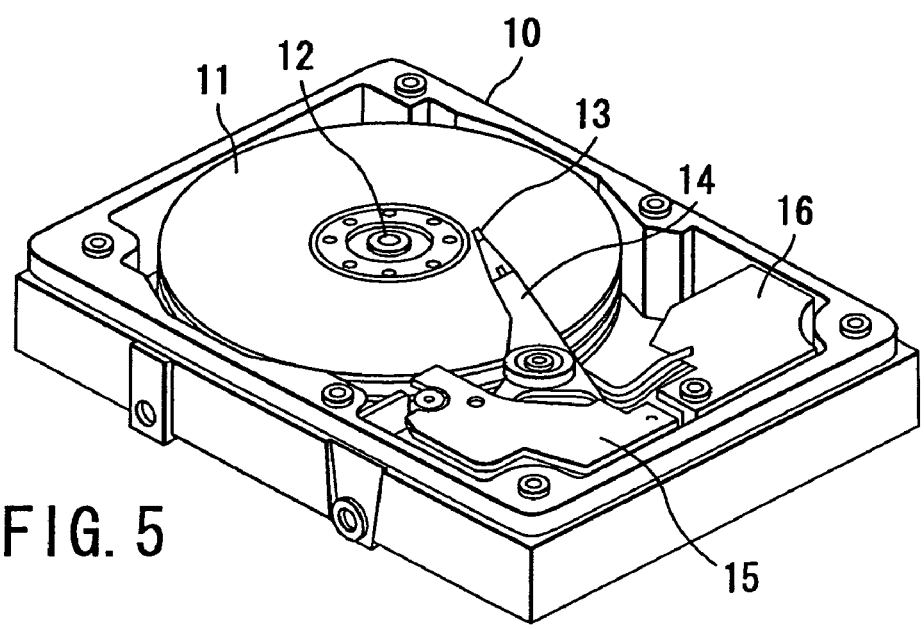
FIG. 5 is an external view of the disk drive according to the embodiment of the present invention.

The present embodiment is directed to a disk drive of a perpendicular magnetic recording type. As shown in FIGS. 4 and 5, a housing 10 (excluding a top cover) of a drive body incorporate a drive mechanism including a disk medium (simply referred to as a disk hereinafter) 11, a spindle motor (SPM) 12 and an actuator 14. FIG. 5 is an external view of the disk drive shown in FIG. 4.

The actuator 14 has a head 13 and moves above the disk 11 in its radial direction by the driving force of a voice coil motor (VCM) 15. For example, the head 13 is configured by both a write head of a single pole head and a read head of a GMR element, which are mounted on a single slider. The disk 11 is, for example, a two-layer disk including a recording magnetic layer of a perpendicular magnetic recording type and a soft magnetic layer that is interposed between the recording magnetic layer and the substrate.

The housing 10 also incorporates a circuit board 16. The circuit board 16 includes a preamplifier circuit that is connected to the head 13 via a flexible print cable (FPC) to transmit a read/write signal. Another circuit board has a microprocessor (CPU) 400 that implements a servo controller for performing head positioning control.

The disk 11 has a servo area 100 on which servo data is recorded. A servo track write (STW), which will be described later, writes servo data on the disk 11 in a servo write step included in the manufacturing process of the disk drive. The servo controller 400 controls the actuator 14 to position the head 13 in a target point based on the servo data read by the read head of the head 13.

Figure 2:
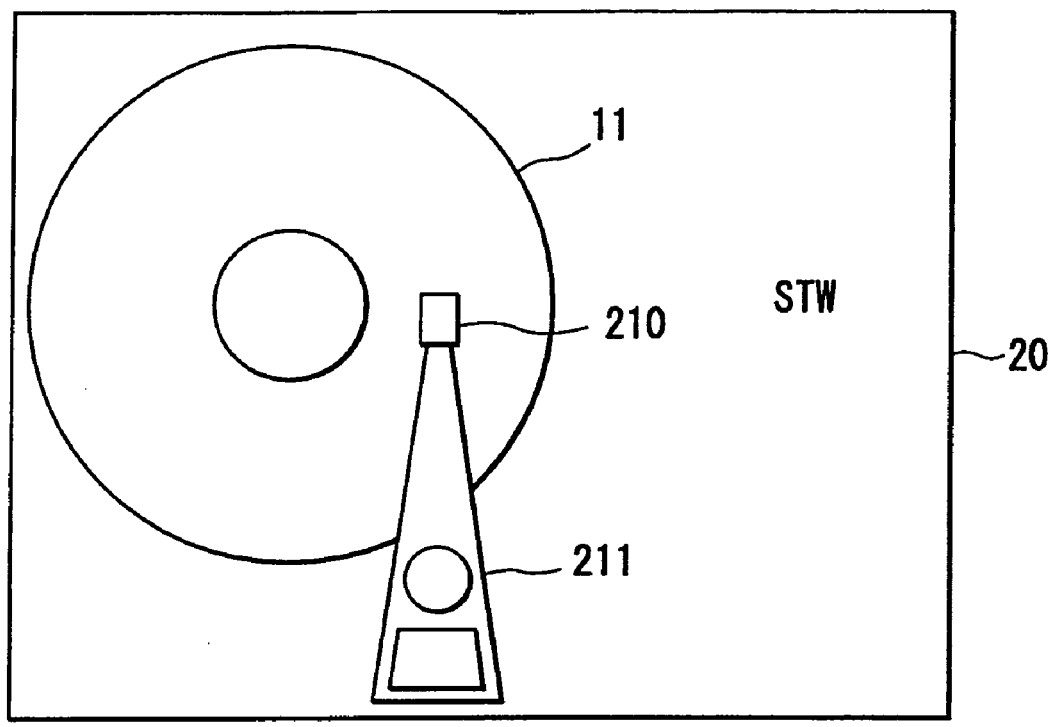
FIG. 2 is a block diagram of the principal part of a servo track writer according to the embodiment of the present invention.

The STW 20 is a dedicated device for writing servo data on the disk medium 11, as illustrated in FIG. 2. The STW 20 includes a servo head 210 and an actuator mechanism 211 for positioning the servo head 210 on the disk medium 11. The STW 20 also includes a mechanism for positioning the servo head 210 to write servo data on the disk medium 11 through the servo head 210.

(Servo Write Method)

A servo write method according to the embodiment of the present invention will now be described with reference to FIGS. 1A to 1C, 3, 6A, 6B, 7A and 7B.

In the servo write method, the STW 20 with the servo head 210 as shown in FIG. 2 writes servo data on the disk medium 11 in its radial direction. The STW 20 also writes the servo data such that servo areas 100 in the radial direction are arranged at regular intervals in the circumferential direction of the disk medium 11 as shown in FIG. 4. The disk medium 11 on which the servo data is written by the STW 20 is attached to the SPM 12 of the disk drive.

Figure 3:
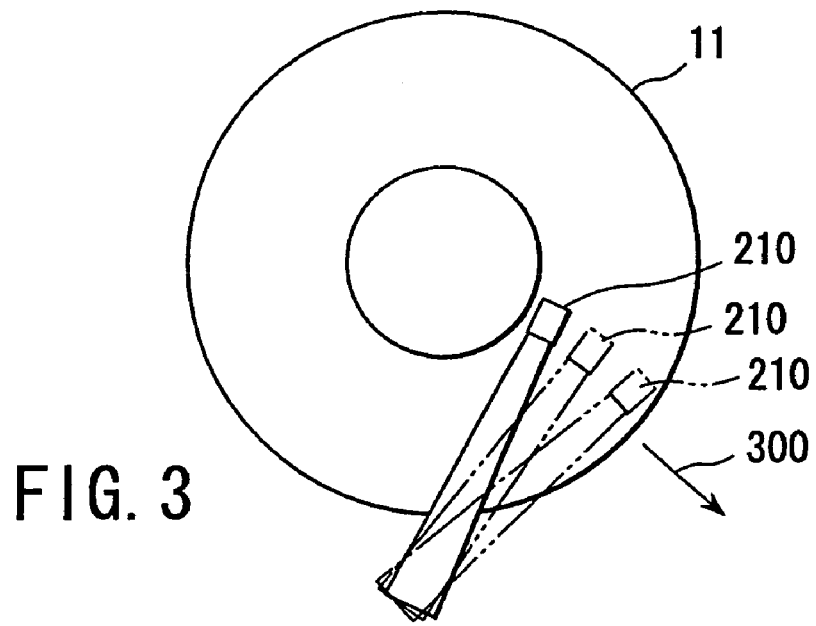
FIG. 3 is an illustration for describing a skew angle of a head according to the embodiment of the present invention.

Referring to FIG. 3, the STW 20 writes servo data while causing the servo head 210 to seek in the radial direction (arrow 300) of the disk medium 11, e.g., from the innermost radius to the outermost radius.

Figure 1A:
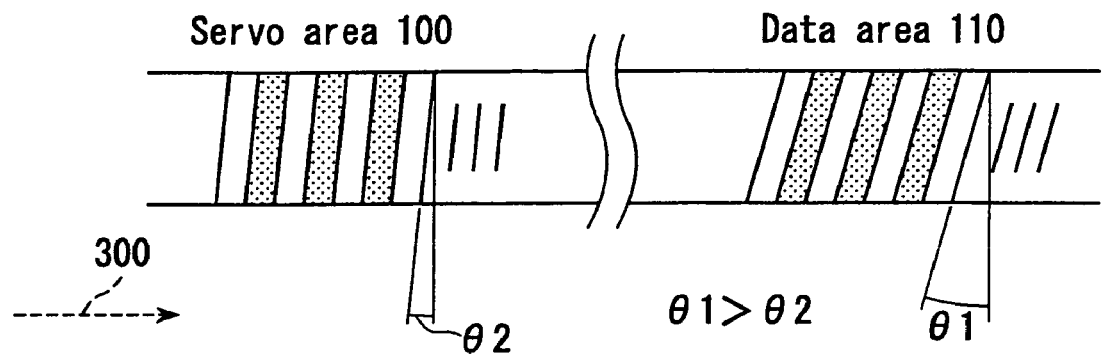
FIGS. 1A to 1C are illustrations for describing a servo write method according to an embodiment of the present invention.
Figure 1B:
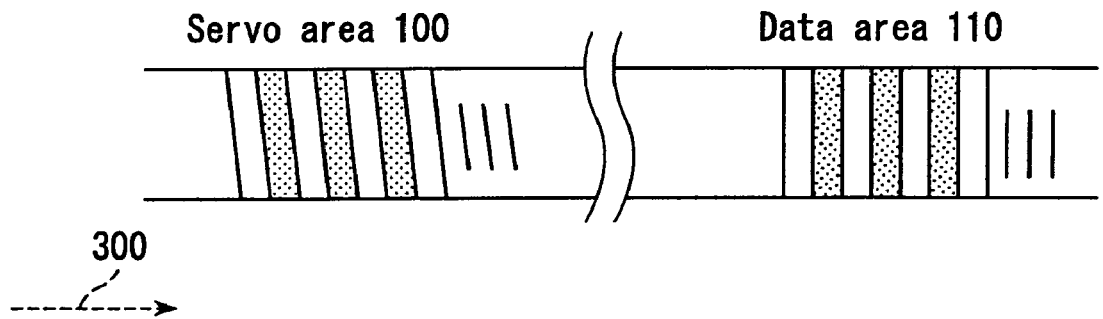

While the servo head 210 is seeking in the intermediate radius of the disk medium 11, the inclination (skew angle) of servo data written to the servo areas 100 is almost 0 degrees as shown in FIG. 1B. In other words, the relative angle between servo data recorded by the STW 20 and data (user data) recorded on data areas 110 by the head 13 of the disk drive is almost 0 degrees. The inclination of the servo data written to the servo areas 100 corresponds to that of magnetic transition in a data track and represents an angle relative to the inclination of data when the data is written to the data areas 110 in the data track.

On the other hand, when the servo head 210 seeks from the intermediate radius of the disk medium 11 toward the outer radius thereof, its skew angle generally increases monotonously from 0 degrees. When the servo head 210 seeks from the inner radius of the disk medium 11 toward the intermediate radius thereof, its skew angle decreases monotonously from the initial value and becomes zero in the intermediate radius. No erase area is caused by an overwrite operation from the start of write of servo data in the inner radius to the intermediate radius. For example, as shown in FIG. 1C, no erase area occurs in the inner radius of the disk medium 11.

In contrast, when the servo head seeks from the intermediate radius to the outer radius as described above, an erase area will occur from the intermediate radius to the end of write of servo data in the outer radius. In the present embodiment, therefore, as shown in FIG. 1A, the servo write operation is performed such that the skew angle ($\theta 2$) of the servo head 210 becomes smaller than that ($\theta 1$) of the head 13 of the disk drive at the end of write of servo data in the outer radius. In other words, the inclination ($\theta 2$) of servo data written to the servo areas 100 becomes smaller than that ($\theta 1$) of data (user data) of the data areas 110 written by the head 13 of the disk drive.

In short, according to the servo write method of the present embodiment, an erase area can be prevented from occurring by relatively decreasing the skew angle of the servo head 210 in a position of the outer radius of the disk medium where the skew angle is to become large in the radial direction of the disk medium.

Figure 1C:
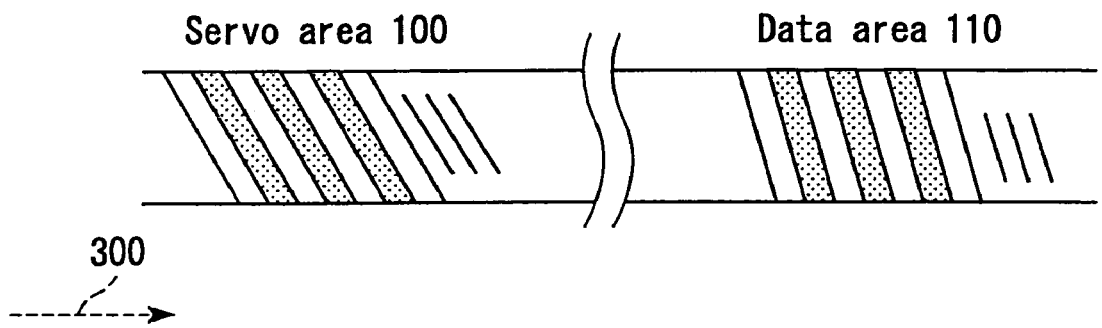
Figure 1A:
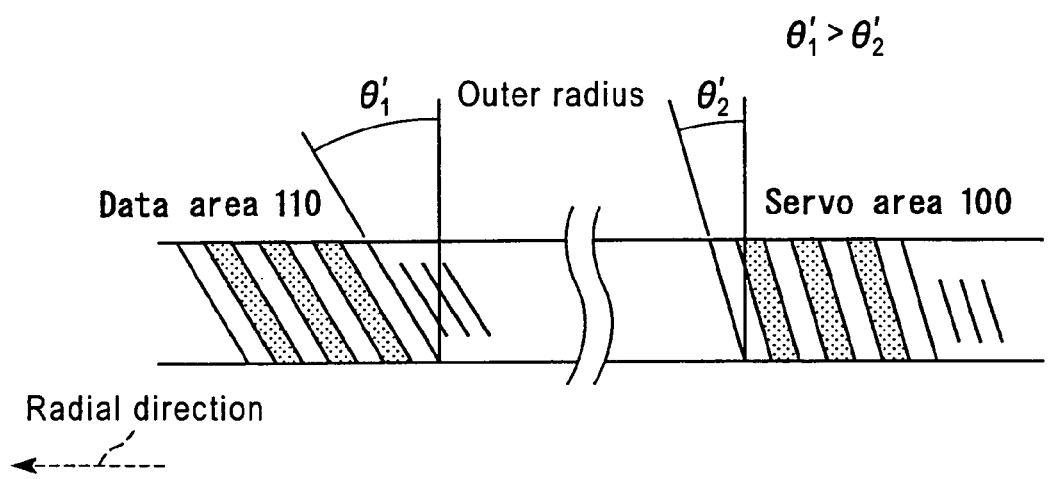

In the disk drive of the present embodiment, the inclination of servo data in the servo areas 100 and that of data (user data) in the data areas 110 differ from each other in the inner and outer radiuses other than the intermediate radius on the disk medium 11, as shown in FIGS. 1A, 1C. On the other hand, an erase area is prevented from occurring and servo data is reliably recorded in the servo areas 100 included in the inner and outer radiuses. Consequently, the read head of the head 13 can reliably read servo data from the servo areas 100 at the time of head positioning control, thus improving the head positioning accuracy.

In the servo write method according to the present embodiment, the servo head 210 writes servo data while it is seeking in the radial direction of the disk medium 11, e.g., from the innermost radius to the outermost radius. In contrast, the servo head 210 can write servo data while it is seeking in the radial direction of the disk medium 11, e.g., from the outermost radius to the innermost radius. In this case, when the servo head 210 seeks from the intermediate radius of the disk medium 11 to the inner radius thereof, if the skew angle of the servo head 210 increases monotonously, an erase area is prevented from occurring by relatively decreasing the skew angle in a position of the inner radius where the skew angle is to become large. (See FIG. 1AA).

The advantages of the servo write method according to the present embodiment will now be described with reference to FIGS. 6A, 6B, 7A and 7B.

Figure 6A:
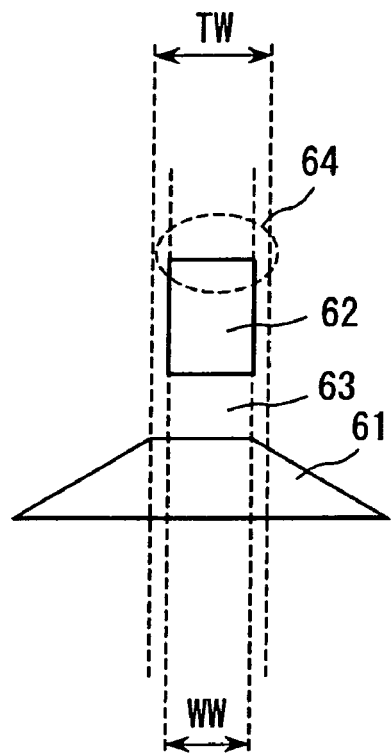
FIGS. 6A and 6B are illustrations for describing a factor in causing an erase area according to the embodiment of the present invention.
Figure 6B:
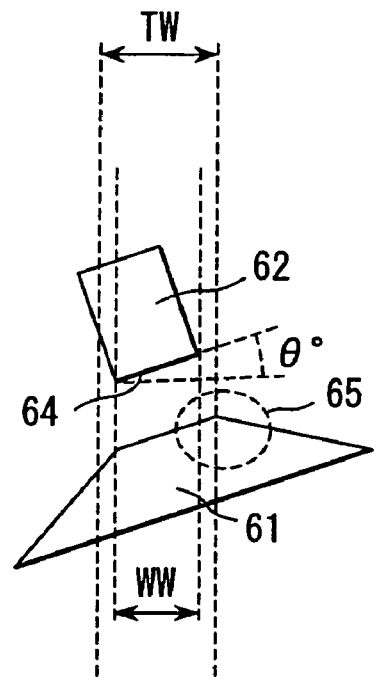

Referring to FIGS. 6A and 6B, the servo head includes a leading pole 61 and a trailing pole 62. The servo head records servo data at a trailing edge 64 of the trailing pole 62 using a leakage flux of a write gap 63. FIG. 6A shows the trailing edge 64 that is positioned in the center of a data track (having a track width TW). In FIG. 6A, WW indicates a write width (or servo data width) in relation to the track width TW.

As shown in FIG. 6A, if the skew angle of the head is 0 degrees, the trailing edge 64 of the pole 62 is located in the center of the data track, as is the leading edge thereof. Thus, there is no difference in recording position between both the edges, and the final recording is performed at the trailing edge 64.

When the skew angle of the head is $\theta$ as shown in FIG. 6B, the leading edge is not located in the center of the data track even though the trailing edge 64 is located therein. For this reason, the data recorded at one end portion 65 of the leading edge in its track width direction is not overwritten at the trailing edge 64 but remains. The skew angle $\theta$ means an angle at which an adequate erase area occurs.

Since, actually, the recording capability of the edge is low, data is difficult to record correctly; however, there is a possibility that the past-recorded signal will be erased to degrade the signal quality of servo data. An area from which the past-recorded signal is erased is referred to as an erase area. To prevent data from being erased from an adjacent track, the number of erase areas has to be minimized.

If the skew angle of the head is large as described above, there occurs a problem that an erase area is caused at the fringe of the disk medium to degrade the signal quality of servo data when the servo data is recorded on the disk medium. The larger the skew angle, the larger the erase area.

If the skew angle of the servo head is simply decreased to the contrary, an erase area of servo data can be prevented from occurring. If, however, the skew angle of the head of the disk drive, no servo data can be read out correctly. Therefore, the skew angle of the servo head of the STW is decreased so as to reduce the erase area, while the skew angle of the head of the disk drive is set relatively large. In the disk drive, therefore, servo data can correctly be read even in the inner and outer radiuses of the disk medium in which the skew angle of the head becomes large. As a result, the head 13 can be positioned on the disk medium with high precision.

Figure 7A:
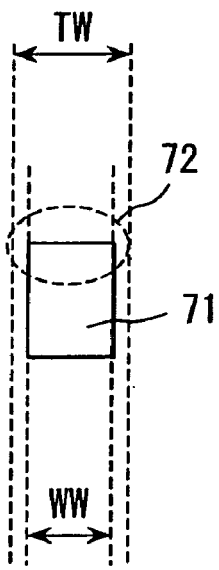
FIGS. 7A and 7B are illustrations for describing a factor in causing an erase area in a perpendicular magnetic recording method according to the embodiment of the present invention.
Figure 7B:
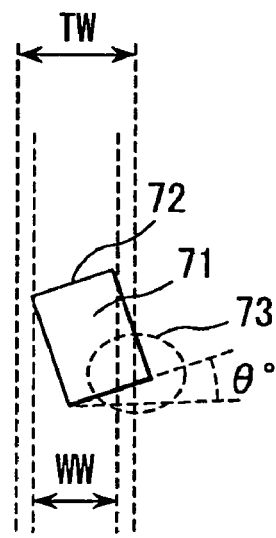

The single pole type head is a write head that is applied to the perpendicular magnetic recording method. As shown in FIG. 7A, the single pole type head records data using the entire surface of a main pole (trailing pole) 71. In this case, too, if the skew angle $\theta$ is large as shown in FIG. 7B, when the edge 72 of the main pole 71 is positioned in the center of a data track, its opposite edge 73 protrudes toward the adjacent track to overwrite the servo data on this track.

The above overwrite differs from the erase area in mechanism of occurrence, but they are substantially equal to each other in their influence upon the past recorded signal. Therefore, servo data can reliably be read out by setting the inclination of data larger than that of servo data (magnetization transition) in a data track. In short, it is effective to configure the disk drive of the perpendicular magnetic recording type such that the servo head of the STW and the head 13 of the disk drive are caused to differ in skew angle from each other and the skew angle of the servo head becomes smaller than that of the head 13 of the drive at the end of servo data in the radial direction. The head positioning accuracy can thus be improved.

As described in detail above, the present embodiment is directed to a disk drive that prevents an erase area from occurring on a disk medium and improves the head positioning accuracy when servo data is recorded on the disk medium. More specifically, the servo head of the STW and the head of the disk drive are caused to differ in skew angle from each other, and the servo data recorded on the servo areas on the disk medium and the data recorded on the data areas are caused to differ in inclination from each other.

In other words, the skew angle of the head of the disk drive and that of the servo head for recording servo data are set separately from each other. Thus, an erase area is prevented from occurring when servo data is written. There occurs an area in which the inclination of servo data and that of data written by the head are different; however, the signal quality of servo data can be prevented from degrading when the servo data is read out. Consequently, the disk drive of the present invention can be improved in head positioning accuracy more than the prior art disk drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a head which reads/writes data from/to a disk medium that rotates;
an actuator which includes the head and rotates in a radial direction of the disk medium to move the head to a target point; and
a controller which controls the actuator to position the head in the target point in accordance with servo data read from the disk medium by the head,
wherein the disk medium includes a number of data tracks having servo areas and data areas, the servo data being pre-recorded on the servo areas in one of outer and inner radii of the disk medium by a servo head of a servo track writer with a skew angle that is different from a skew angle of the head such that an inclination of the servo data is smaller than that of the data recorded on the data areas of said one of outer and inner radii by the head.

2. The disk drive according to claim 1, which is a perpendicular magnetic recording type disk drive having a single pole type head as a write head.

3. The disk drive according to claim 1, wherein:
the servo head follows a trail different from that of the head;
the skew angle of the servo head in the inner radius is smaller than that of the head when the servo head moves from the outer radius to the inner radius of the disk medium, and
the skew angle of the servo head in the outer radius is smaller than that of the head when the servo head moves from the inner radius to the outer radius of the disk medium.

4. A disk drive comprising:
a head which reads/writes data from/to a disk medium that rotates;
an actuator which includes the head and rotates in a radial direction of the disk medium to move the head to a target point; and
a controller which controls the actuator to position the head in the target point in accordance with servo data read from the disk medium by the head,
wherein the disk medium includes a number of data tracks having servo areas and data areas and, when the head records data on the data areas in one of outer and inner radii of the disk medium, the servo data whose inclination differs from that of the data is pre-recorded on the servo areas in one of the outer and inner radii by a servo track writer and the servo data whose inclination is almost equal to that of the data recorded on the data areas is pre-recorded on the servo areas in the data tracks included in an intermediate radius of the disk medium by the servo track writer.

5. The disk drive according to claim 4, which is a perpendicular magnetic recording type disk drive having a single pole type head as a write head.

6. A disk drive comprising:
a head which reads/writes data from/to a disk medium that rotates;
an actuator which includes the head and rotates in a radial direction of the disk medium to move the head to a target point; and
a controller which controls the actuator to position the head in the target point in accordance with servo data read from the disk medium by the head,
wherein the disk medium includes a number of data tracks having servo areas and data areas and, when the head records data on the data areas in one of outer and inner radii of the disk medium, the servo data whose inclination differs from that of the data is pre-recorded on the servo areas in one of the outer and inner radii by a servo track writer and the servo data whose inclination is 0 degrees and almost equal to that of the data recorded on the data areas is pre-recorded on the servo areas in the data tracks included in an intermediate radius of the disk medium by the servo track writer, and the servo data whose inclination is smaller than that of the data recorded on the data areas is pre-recorded on the servo areas in the data tracks included in the outer radius by the servo track writer.

7. A disk drive comprising:
a head which reads/writes data from/to a disk medium that rotates;
an actuator which includes the head and rotates in a radial direction of the disk medium to move the head to a target point; and
a controller which controls the actuator to position the head in the target point in accordance with servo data read from the disk medium by the head,
wherein the disk medium includes a number of data tracks having servo areas and data areas and, when the head records data on the data areas in one of outer and inner radii of the disk medium, the servo data whose inclination differs from that of the data is pre-recorded on the servo areas in one of the outer and inner radii by a servo track writer and the servo data whose inclination is 0 degrees and almost equal to that of the data recorded on the data areas is pre-recorded on the servo areas in the data tracks included in an intermediate radius of the disk medium by the servo track writer, and the servo data whose inclination is smaller than that of the data pre-recorded on the data areas is recorded on the servo areas in the data tracks included in the inner radius by the servo track writer.

8. A servo write method that is applied to a disk drive including a head which reads/writes data from/to a disk medium that rotates and an actuator which moves the head to a target point, the method comprising:
using a servo head whose skew angle $\theta 2$ differs from a skew angle $\theta 1$ of the head, the servo head being provided in a servo track writer; and
recording servo data to position the head on servo areas by the servo head in each of data tracks of the disk medium at an inclination different from that of data recorded on data areas by the head with the skew angle $\theta 1$,
wherein the servo data whose inclination is 0 degrees and almost equal to that of the data recorded on the data areas is recorded on the servo areas in an intermediate radius of the disk medium, and the servo data whose inclination is smaller than that of the data recorded on the data areas is recorded on the servo areas in an outer radius of the disk medium.

9. The method according to claim 8, wherein the disk drive is a perpendicular magnetic recording type disk drive having a single pole type head as a write head.

10. A servo write method that is applied to a disk drive including a head which reads/writes data from/to a disk medium that rotates and an actuator which moves the head to a target point, the method comprising:
using a servo head whose skew angle $\theta 2$ differs from a skew angle $\theta 1$ of the head, the servo head being provided in a servo track writer; and
recording servo data to position the head on servo areas by the servo head in each of data tracks of the disk medium at an inclination different from that of data recorded on data areas by the head with the skew angle $\theta 1$,
wherein the servo data whose inclination is 0 degrees and almost equal to that of the data recorded on the data areas is recorded on the servo areas in an intermediate radius of the disk medium, and the servo data whose inclination is smaller than that of the data recorded on the data areas is recorded on the servo areas in an inner radius of the disk medium.

11. A servo write method that is applied to a disk drive including a head which reads/writes data from/to a disk medium that rotates and an actuator which moves the head to a target point, the method comprising:
using a servo head whose skew angle $\theta 2$ differs from a skew angle $\theta 1$ of the head, the servo head being provided in a servo track writer; and
recording servo data to position the head on servo areas by the servo head in each of data tracks of the disk medium at an inclination different from that of data recorded on data areas by the head with the skew angle $\theta 1$
wherein the servo head is provided in a servo track writer that is a device exclusively to record the servo data on the disk medium, and the servo track writer has a servo head which sets the skew angle $\theta 2$ different from the skew angle $\theta 1$ of the head, and the servo track writer uses a servo head having a relatively small skew angle $\theta 2$ which differs from the skew angle $\theta 1$ of the head of the disk drive, writes servo data while moving the servo head from an innermost radius to an intermediate radius of the disk medium and then from the intermediate radius to an outermost radius thereof, and performs a servo write operation such that an inclination of the servo data corresponding to the skew angle $\theta 2$ of the servo head is smaller than that of user data corresponding to the skew angle $\theta 1$ of the head.

* * * * *